(12) United States Patent
Bhamri et al.

(10) Patent No.: US 11,349,590 B2
(45) Date of Patent: May 31, 2022

(54) SIGNALING ASPECTS FOR INDICATION OF CO-SCHEDULED DMRS PORTS IN MU-MIMO

(71) Applicant: Panasonic Intellectual Property Corporation of America, Torrance, CA (US)

(72) Inventors: Ankit Bhamri, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 96 days.

(21) Appl. No.: 16/834,240

(22) Filed: Mar. 30, 2020

(65) Prior Publication Data
US 2020/0228225 A1 Jul. 16, 2020

Related U.S. Application Data

(63) Continuation of application No. PCT/EP2018/075011, filed on Sep. 17, 2018.

(30) Foreign Application Priority Data

Oct. 3, 2017 (EP) .................................... 17194653

(51) Int. Cl.
*H04W 76/27* (2018.01)
*H04J 13/10* (2011.01)
(Continued)

(52) U.S. Cl.
CPC ............ *H04J 13/102* (2013.01); *H04J 13/12* (2013.01); *H04L 5/0051* (2013.01); *H04L 5/10* (2013.01);
(Continued)

(58) Field of Classification Search
CPC ....... H04J 13/102; H04J 13/12; H04W 76/27; H04L 5/0051; H04L 27/2607; H04B 7/0452
See application file for complete search history.

(56) References Cited

U.S. PATENT DOCUMENTS 8,837,371 B2 9/2014 Su et al.
2011/0176517 A1* 7/2011 Hu .................. H04L 5/0026
370/335

(Continued)

FOREIGN PATENT DOCUMENTS

CN 105191203 A 12/2015
CN 107113147 A 8/2017
(Continued)

OTHER PUBLICATIONS

Source: Intel Corporation, Title: "On the remaining details of DM-RS", date: Sep. 17, 2017; R1-1716300. page 1-18.*
(Continued)

*Primary Examiner* — Fahmida S Chowdhury
(74) *Attorney, Agent, or Firm* — Seed IP Law Group LLP

(57) ABSTRACT

The present disclosure relates to a mobile terminal, a base station, a method for data transmission/reception by a mobile terminal, and a method for data reception/transmission by a base station. The mobile terminal comprises circuitry which, in operation, receives a parameter defining a configuration for assigning to ports respective resources for carrying reference signals, the resources being grouped in a plurality of code division multiplexing, CDM, groups, and receives control information indicating one of the set of layer-to-port mapping combinations which is to be applied for arranging reference signals on ports of at least one CDM group for data transmission and/or reception, wherein the control information indicates a co-scheduling information
(Continued)

| Index | Number of layers/UE | Ports | MU-MIMO Enabled in CDM Group 0 | MU-MIMO Enabled in CDM Group 1 |
|---|---|---|---|---|
| 0 | 1 | P0 | 0 | 0 |
| 1 | 1 | P0 | 1 | 0 |
| 2 | 1 | P0 | 1 | 1 |
| 3 | 1 | P1 | 1 | 0 |
| 4 | 1 | P1 | 1 | 1 |
| 5 | 1 | P2 | 1 | 0 |
| 6 | 1 | P2 | 1 | 1 |
| 7 | 1 | P3 | 1 | 1 |
| 8 | 2 | P0-P1 | 0 | 0 |
| 9 | 2 | P0-P1 | 0 | 1 |
| 10 | 2 | P2-P3 | 1 | 0 |
| 11 | 3 | P0-P2 | 0 | 0 |
| 12 | 4 | P0-P4 | 0 | 0 |

Max. Nr. of UEs in MU-MIMO: 2
Max. Nr. of ports/UE in MU-MIMO: 2
Max. Nr. of ports/UE in SU-MIMO: 4
Nr. of X co-scheduled UEs for signalling: 1 for the at least one and/or at least a different CDM group of the plurality of CDM groups for the same data transmission and/or reception.

17 Claims, 8 Drawing Sheets

(51) Int. Cl.
*H04J 13/12* (2011.01)
*H04L 5/00* (2006.01)
*H04L 5/10* (2006.01)
*H04L 27/26* (2006.01)

(52) U.S. Cl.
CPC ......... *H04L 27/2607* (2013.01); *H04W 76/27* (2018.02)

(56) References Cited

U.S. PATENT DOCUMENTS

| | | | |
|---|---|---|---|
| 2012/0300709 A1* | 11/2012 | Su | H04L 1/1893 370/328 |
| 2014/0192756 A1 | 7/2014 | Baldemair et al. | |
| 2015/0063236 A1* | 3/2015 | Seo | H04L 5/00 370/329 |
| 2015/0189632 A1 | 7/2015 | Inoue et al. | |
| 2015/0223209 A1* | 8/2015 | Seo | H04W 72/042 370/329 |
| 2015/0038256 A1 | 12/2015 | Kim et al. | |
| 2015/0382356 A1* | 12/2015 | Kim | H04W 72/0466 370/335 |
| 2016/0080963 A1* | 3/2016 | Marinier | H04L 5/0082 370/252 |
| 2017/0374656 A1 | 12/2017 | Kim et al. | |
| 2019/0182697 A1* | 6/2019 | Zhang | H04B 7/088 |
| 2019/0372641 A1* | 12/2019 | Muruganathan | H04B 7/0617 |

FOREIGN PATENT DOCUMENTS

| | | |
|---|---|---|
| RU | 2014 108 326 A | 9/2015 |
| WO | 2016/127309 A1 | 8/2016 |

OTHER PUBLICATIONS

3GPP TR 38.801 V2.0.0, "$3^{rd}$ Generation Partnership Project; Technical Specification Group Radio Access Network; Study on New Radio Access Technology; Radio Access Architecture and Interfaces (Release 14)," Mar. 2017, 90 pages.
3GPP TR 38.913 V14.1.0, "$3^{rd}$ Generation Partnership Project; Technical Specification Group Radio Access Network; Study on Scenarios and Requirements for Next Generation Access Technologies; (Release 14)," Dec. 2016, 38 pages.
3GPP TS 36.212 V14.3.0, "$3^{rd}$ Generation Partnership Project; Technical Specification Group Radio Access Network; Evolved Universal Terrestrial Radio Access (E-UTRA); Multiplexing and channel coding (Release 14)," Jun. 2017, 198 pages.
Extended European Search Report, dated Mar. 22, 2018, for European Application No. 17194653.6- 1220, 13 pages.
Huawei, HiSilicon, "Rate matching for data channels," R1-1717298, Agenda Item: 7.2.1.5, 3GPP TSG RAN WG1 Meeting #90bis, Prague, Czech Republic, Oct. 9-13, 2017, 6 pages.
Intel Corporation, "On the remaining details of DM-RS," R1-1716300, Agenda item: 6.2.3.3, 3GPP TSG RAN WG1 Meeting NR #3, Nagoya, Japan, Sep. 18-21, 2017, 18 pages.
International Search Report, dated Dec. 13, 2018, for International Application No. PCT/EP2018/075011, 3 pages.
NTT Docomo, Inc., "Revised WID on New Radio Access Technology," RP-171485, Agenda Item 9.2.1, 3GPP TSG RAN Meeting #75, West Palm Beach, USA, Jun. 5-8, 2017, 11 pages.
Sesia et al., "LTE: The UMTS Long Term Evolution," Second Edition, sections 8.2, 9.3.5, 11.2.2.2 and 29.1.1, 28 pages.
Chinese Office Action, dated Aug. 3, 2021, for Chinese Application No. 201880064559.7, 27 pages. (with English Translation).
Russian Office Action, dated Sep. 23, 2021, for Russian Application No. 2020112051/07(020411), 12 pages. (with English Translation).
Indian Office Action, dated Mar. 9, 2022, for Indian Application No. 202047018327, 6 pages.

\* cited by examiner

- FDM1 x 2 FD-OCC : CDM Group 0
- FDM2 x 2 FD-OCC : CDM Group 1
- FDM3 x 2 FD-OCC : CDM Group 2
- Control
- Data

- FDM1 x 2 FD-OCC x 2 TD-OCC : CDM Group 0
- FDM2 x 2 FD-OCC x 2 TD-OCC : CDM Group 1
- FDM3 x 2 FD-OCC x 2 TD-OCC : CDM Group 2
- Control
- Data

| Index | Number of layers/UE | Ports | MU-MIMO Enabled in CDM Group 0 | MU-MIMO Enabled in CDM Group 1 |
|---|---|---|---|---|
| 0 | 1 | P0 | 0 | 0 |
| 1 | 1 | P0 | 1 | 0 |
| 2 | 1 | P0 | 1 | 1 |
| 3 | 1 | P1 | 1 | 0 |
| 4 | 1 | P1 | 1 | 1 |
| 5 | 1 | P2 | 1 | 0 |
| 6 | 1 | P2 | 1 | 1 |
| 7 | 1 | P3 | 1 | 1 |
| 8 | 2 | P0-P1 | 0 | 0 |
| 9 | 2 | P0-P1 | 0 | 1 |
| 10 | 2 | P2-P3 | 1 | 0 |
| 11 | 3 | P0-P2 | 0 | 0 |
| 12 | 4 | P0-P4 | 0 | 0 |

Max. Nr. of UEs in MU-MIMO: 2
Max. Nr. of ports/UE in MU-MIMO: 2
Max. Nr. of ports/UE in SU-MIMO: 4
Nr. of X co-scheduled UEs for signalling: 1

Fig. 3

| Index | Number of layers/UE | Ports | MU-MIMO Enabled in CDM Group 0 | MU-MIMO Enabled in CDM Group 1 |
|---|---|---|---|---|
| 0 | 1 | P0 | 0 | 0 |
| 1 | 1 | P0 | 1 | 0 |
| 2 | 1 | P0 | 1 | 1 |
| 3 | 1 | P1 | 1 | 0 |
| 4 | 1 | P1 | 1 | 1 |
| 5 | 1 | P2 | 1 | 0 |
| 6 | 1 | P2 | 1 | 1 |
| 7 | 1 | P3 | 1 | 0 |
| 8 | 1 | P3 | 1 | 1 |
| 9 | 1 | P4 | 1 | 1 |
| 10 | 1 | P4 | 1 | 1 |
| 11 | 1 | P5 | 1 | 1 |
| 12 | 1 | P6 | 1 | 1 |
| 13 | 1 | P7 | 1 | 1 |
| 14 | 2 | P0-P1 | 0 | 0 |
| 15 | 2 | P0-P1 | 1 | 0 |
| 16 | 2 | P0-P1 | 1 | 1 |
| 17 | 2 | P2-P3 | 1 | 0 |
| 18 | 2 | P2-P3 | 1 | 1 |
| 19 | 2 | P4-P5 | 1 | 0 |
| 20 | 2 | P4-P5 | 1 | 1 |
| 21 | 2 | P6-P7 | 0 | 0 |
| 22 | 3 | P0-P2 | 1 | 0 |
| 23 | 3 | P0-P2 | 1 | 1 |
| 24 | 3 | P0-P2 | 1 | 0 |
| 25 | 3 | P4-P6 | 1 | 1 |
| 26 | 3 | P4-P6 | 1 | 0 |
| 27 | 4 | P0-P3 | 0 | 1 |
| 28 | 4 | P0-P3 | 0 | 1 |
| 29 | 4 | P4-P7 | 1 | 0 |

Max. Nr. of UEs in MU-MIMO: 4
Max. Nr. of ports/UE in MU-MIMO: 4
Max. Nr. of ports/UE in SU-MIMO: 4
Nr. of X co-scheduled UEs for signalling: 2

Fig. 4

| Index | Number of layers/UE | Ports | MU-MIMO Enabled in CDM Group 0 | MU-MIMO Enabled in CDM Group 1 | MU-MIMO Enabled in CDM Group 2 |
|---|---|---|---|---|---|
| 0 | 1 | P0 | 0 | 0 | 0 |
| 1 | 1 | P0 | 1 | 0 | 0 |
| 2 | 1 | P0 | 1 | 1 | 0 |
| 3 | 1 | P0 | 1 | 1 | 1 |
| 4 | 1 | P1 | 1 | 0 | 0 |
| 5 | 1 | P1 | 1 | 1 | 0 |
| 6 | 1 | P1 | 1 | 1 | 1 |
| 7 | 1 | P2 | 1 | 0 | 0 |
| 8 | 1 | P2 | 1 | 1 | 0 |
| 9 | 1 | P2 | 1 | 1 | 1 |
| 10 | 1 | P3 | 1 | 1 | 0 |
| 11 | 1 | P3 | 1 | 1 | 1 |
| 12 | 1 | P4 | 1 | 1 | 1 |
| 13 | 1 | P4 | 1 | 1 | 1 |
| 14 | 1 | P5 | 1 | 1 | 1 |
| 15 | 2 | P0-P1 | 0 | 0 | 0 |
| 16 | 2 | P0-P1 | 0 | 1 | 0 |
| 17 | 2 | P0-P1 | 0 | 1 | 1 |
| 18 | 2 | P2-P3 | 1 | 0 | 0 |
| 19 | 2 | P2-P3 | 1 | 0 | 1 |
| 20 | 2 | P4-P5 | 1 | 1 | 0 |
| 21 | 3 | P0-P2 | 0 | 0 | 0 |
| 22 | 4 | P0-P3 | 0 | 0 | 0 |

Max. Nr. of UEs in MU-MIMO: 3
Max. Nr. of ports/UE in MU-MIMO: 2
Max. Nr. of ports/UE in SU-MIMO: 4
Nr. of X co-scheduled UEs for signalling: 1

Fig. 5

| Index | Number of layers/UE | Ports | MU-MIMO Enabled in CDM Group 0 | MU-MIMO Enabled in CDm Group 1 | MU-MIMO Enabled in CDM Group 2 |
|---|---|---|---|---|---|
| 0 | 1 | P0 | 0 | 0 | 0 |
| 1 | 1 | P0 | 1 | 0 | 0 |
| 2 | 1 | P0 | 1 | 1 | 0 |
| 3 | 1 | P0 | 1 | 1 | 1 |
| 4 | 1 | P1 | 1 | 0 | 0 |
| 5 | 1 | P1 | 1 | 1 | 0 |
| 6 | 1 | P1 | 1 | 1 | 1 |
| 7 | 1 | P2 | 1 | 0 | 0 |
| 8 | 1 | P2 | 1 | 1 | 0 |
| 9 | 1 | P2 | 1 | 1 | 1 |
| 10 | 1 | P3 | 1 | 1 | 0 |
| 11 | 1 | P3 | 1 | 0 | 0 |
| 12 | 1 | P3 | 1 | 1 | 1 |
| 13 | 1 | P4 | 1 | 1 | 0 |
| 14 | 1 | P4 | 1 | 1 | 0 |
| 15 | 1 | P4 | 1 | 1 | 1 |
| 16 | 1 | P5 | 1 | 0 | 0 |
| 17 | 1 | P5 | 1 | 1 | 1 |
| 18 | 1 | P5 | 1 | 1 | 0 |
| 19 | 1 | P6 | 1 | 1 | 1 |
| 20 | 1 | P6 | 1 | 1 | 0 |
| 21 | 1 | P7 | 1 | 1 | 1 |
| 22 | 1 | P7 | 1 | 1 | 1 |

Max. Nr. of UEs in MU-MIMO: 6
Max. Nr. of ports/UE in MU-MIMO: 4
Max. Nr. of ports/UE in SU-MIMO: 4
Nr. of X co-scheduled UEs for signalling: 2

Fig. 6a

| Index | Number of layers/UE | Ports | MU-MIMO Enabled in CDM Group 0 | MU-MIMO Enabled in CDM Group 1 | MU-MIMO Enabled in CDM Group 2 |
|---|---|---|---|---|---|
| 23 | 1 | P8 | 1 | 1 | 0 |
| 24 | 1 | P8 | 1 | 1 | 1 |
| 25 | 1 | P9 | 1 | 1 | 1 |
| 26 | 1 | P10 | 1 | 1 | 1 |
| 27 | 1 | P10 | 1 | 1 | 1 |
| 28 | 1 | P11 | 1 | 1 | 1 |
| 29 | 2 | P0-P1 | 0 | 0 | 0 |
| 30 | 2 | P0-P1 | 1 | 0 | 0 |
| 31 | 2 | P0-P1 | 1 | 1 | 0 |
| 32 | 2 | P0-P1 | 1 | 0 | 1 |
| 33 | 2 | P2-P3 | 1 | 0 | 0 |
| 34 | 2 | P2-P3 | 1 | 1 | 0 |
| 35 | 2 | P2-P3 | 1 | 1 | 1 |
| 36 | 2 | P4-P5 | 1 | 0 | 0 |
| 37 | 2 | P4-P5 | 1 | 1 | 0 |
| 38 | 2 | P4-P5 | 1 | 1 | 1 |
| 39 | 2 | P6-P7 | 1 | 1 | 0 |
| 40 | 2 | P6-P7 | 1 | 1 | 1 |
| 41 | 2 | P8-P9 | 1 | 1 | 0 |
| 42 | 2 | P8-P9 | 1 | 1 | 1 |
| 43 | 2 | P10-P11 | 1 | 1 | 1 |
| 44 | 3 | P0-P2 | 0 | 0 | 0 |
| 45 | 3 | P0-P2 | 1 | 0 | 0 |
| 46 | 3 | P0-P2 | 1 | 1 | 1 |
| 47 | 3 | P0-P2 | 1 | 0 | 1 |
| 48 | 3 | P4-P6 | 1 | 1 | 0 |
| 49 | 3 | P4-P6 | 1 | 1 | 1 |
| 50 | 3 | P4-P6 | 1 | 1 | 0 |
| 51 | 3 | P8-P10 | 1 | 0 | 0 |
| 52 | 3 | P8-P10 | 1 | 0 | 1 |
| 53 | 4 | P0-P3 | 0 | 0 | 0 |
| 54 | 4 | P0-P3 | 0 | 1 | 0 |
| 55 | 4 | P0-P3 | 0 | 1 | 1 |
| 56 | 4 | P4-P7 | 1 | 0 | 0 |
| 57 | 4 | P4-P7 | 1 | 0 | 1 |
| 58 | 4 | P8-P11 | 1 | 1 | 0 |

Fig. 6b

SIGNALING ASPECTS FOR INDICATION OF CO-SCHEDULED DMRS PORTS IN MU-MIMO

BACKGROUND

1. Technical Field

The present disclosure relates to transmission and reception of data and/or reference signals in resources of a communication system.

2. Description of Related Art

Currently, the $3^{rd}$ Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "*Study on New Radio Access Technology*" involving RAN1, RAN2, RAN3 and RAN4 was approved and is expected to become the Release 15 work item that defines the first 5G standard.

One objective of 5G NR is to provide a single technical framework addressing all usage scenarios, requirements and deployment scenarios defined in 3GPP TSG RAN TR 38.913 v14.1.0, "*Study on Scenarios and Requirements for Next Generation Access Technologies*", December 2016 (available at www.3gpp.org), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility. The backward compatibility to the Long Term Evolution (LTE) is not required, which facilitates a completely new system design and/or the introduction of novel features.

As summarized in one of the technical reports for the NR study item (3GPP TSG TR 38.801 v2.0.0, "*Study on New Radio Access Technology; Radio Access Architecture and Interfaces*", March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

One of the design targets in NR is to seek the common waveform as much as possible for downlink, uplink and sidelink. It has been considered that introduction of the DFT spreading might not be needed for some cases of uplink transmission. The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

The term spatial layer (or layer) refers to one of different streams generated by spatial multiplexing. A layer can be described as a mapping of symbols onto the transmit antenna ports. Each layer is identified by a precoding vector of size equal to the number of transmit antenna ports and can be associated with a radiation pattern. The rank of the transmission is the number of layers transmitted. A codeword is an independently encoded data block, corresponding to a single Transport Block (TB) delivered from the Medium Access Control (MAC) layer in the transmitter to the physical layer, and protected with a cyclic redundancy check (CRC).

Generally, a layer is assigned per transmission time (TTI) interval which in LTE corresponds to the subframe. However, in 3GPP NR, there can be different TTIs, depending on URLLC or eMBB. In particular, in NR the TTI can be a slot, mini-slot, or subframe. For layers, ranks, and codewords, see also section 11.2.2.2 of S. Sesia, I. Toufik and M, Baker, LTE: The UMTS Long Term Evolution, Second Edition.

Conventionally, a reference signal pattern (RS) is transmitted from an antenna port (or port) at the base station. A port may be transmitted either as a single physical transmit antenna, or as a combination of multiple physical antenna elements. In either case, the signal transmitted from each antenna port is not designed to be further deconstructed by the UE receiver: the transmitted RS corresponding to a given antenna port defines the antenna port from the point of view of the UE, and enables the UE to derive a channel estimate for all data transmitted on that antenna port, regardless of whether it represents a single radio channel from one physical antenna or a composite channel from a multiplicity of physical antenna elements together comprising the antenna port. For ports, see also section 8.2 of S. Sesia, I. Toufik and M, Baker, LTE: The UMTS Long Term Evolution, Second Edition.

In LTE, the data transmissions and receptions for a UE are scheduled by the eNB by means of Physical Downlink Control Channel (PDCCH), which carries a message known as Downlink Control Information (DCI), which includes resource assignments and other control information for a UE or group of UEs. In general, several PDCCHs can be transmitted in a subframe.

The required content of the control channel messages depends on the system deployment and UE configuration. For example, if the infrastructure does not support MIMO, or if a UE is configured in a transmission mode which does not involve MIMO, there is no need to signal the parameters that are only required for MIMO transmissions. In order to minimize the signaling overhead, it is therefore desirable that several different message formats are available, each containing the minimum payload required for a particular scenario. On the other hand, to avoid too much complexity in implementation and testing, it is desirable not to specify too many formats. The set of DCI message formats specified in LTE is listed below:

Please refer to the mentioned technical standard or to LTE—The UMTS Long Term Evolution—From Theory to Practice, Edited by Stefanie Sesia, Issam Toufik, Matthew Baker, Chapter 9.3.5.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB (name for a base station in LTE) has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC. A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UE's assigned C-RNTI, semi-persistent scheduling (SPS C-RNTI), or initial allocation (temporary C-RNTI).

A DCI thus specifies the resources on which a UE is to receive or transmit data, including transmission and reception configuration.

BRIEF SUMMARY

One non-limiting and exemplary embodiment facilitates the signaling of co-scheduling information (non-transparent MU-MIMO) on a per code-division multiplexing, CDM, group basis in a mobile communication system where data is transmitted and/or received in layers using multiple antennas. More particularly, the present disclosure suggests sets of layer-to-port mapping combination which are combined with co-scheduling information to facilitate a more efficient and effective signaling mechanism.

In an embodiment, the techniques disclosed here feature a mobile terminal comprising circuitry which, in operation, receives a parameter defining a configuration for assigning to ports respective resources for carrying reference signals, the resources being grouped in a plurality of code division multiplexing, CDM, groups, and receives control information indicating one of the set of layer-to-port mapping combinations which is to be applied for arranging reference signals on ports of at least one CDM group for data transmission and/or reception, wherein the control information indicates a co-scheduling information for the at least one and/or at least a different CDM group of the plurality of CDM groups for the same data transmission and/or reception, and a transceiver which, in operation, performs transmission and/or reception data in layers using multiple antennas based on the co-scheduling information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 3 shows an exemplary set of layer-to-port mapping combinations combined with co-scheduling information on a per CDM group basis for a DMRS configuration type 1, and 1-symbol DMRS configuration;

FIG. 4 shows an exemplary set of layer-to-port mapping combinations combined with co-scheduling information on a per CDM group basis for a DMRS configuration type 1, and 2-symbol DMRS configuration;

FIG. 5 shows an exemplary set of layer-to-port mapping combinations combined with co-scheduling information on a per CDM group basis for the case of a DMRS configuration type 2, and 1-symbol DMRS; and FIGS. 6a and 6b show exemplary set of layer-to-port mapping combinations combined with co-scheduling information on a per CDM group basis for the case of a DMRS configuration type 2, and 2-symbol DMRS.

DETAILED DESCRIPTION

In $3^{rd}$ generation partnership project new radio (3GPP NR), reference signals are re-designed to meet the wide range of requirements and use cases. Demodulation reference signals (DMRS) that are used for the purpose of channel estimation are also being designed to have a uniform structure for both uplink and downlink with cyclic-prefix orthogonal frequency division multiplexing (CP-OFDM) waveform. This disclosure relates to the signaling aspects for supporting non-transparent Multi-User Multiple Input Multiple Output (MU-MIMO). Two configurations (with different multiplexing schemes for orthogonal DMRS ports) of front-loaded DMRS will be supported and each configuration with flexibility of using 1-symbol or 2-symbol DMRS.

In current LTE, there is a fixed configuration with single category of multiplexing scheme for orthogonal DMRS ports and no support for non-transparent MU-MIMO.

However, in 3GPP NR, the situation is more complex due to the possibility of more interference from co-scheduled DMRS ports for other UEs. In addition, rate matching is necessary due to frequency division multiplexing (FDM) between different DMRS ports. Based on this, it is expected to support UE non-transparent MU-MIMO in NR. In this disclosure, we provide a framework to indicate at least some information about the co-scheduled DMRS ports within same and/or different CDM groups in MU-MIMO by adding new fields to the DMRS layer-to-port mapping table.

This disclosure relates to NR technology. For NR access technology, see 3GPP TSG RAN Meeting #75, RP-171485 by NTT DoCoMo, "Revised WID on New Radio Access Technology", Jun. 5-8, 2017). More specifically, it deals with the aspects of front-loaded DMRS for both downlink and uplink with CP-OFDM waveform. In RAN1 NR #3 (RAN1 Chairman Notes: RAN1 NR Ad-Hoc #3), DMRS are captured and this provides a framework for signaling of at least some information related to co-scheduled DMRS ports by using DMRS layer-to-port mapping table.

As mentioned, in 3GPP NR, Demodulation Reference Signals (DMRS) are re-designed for both downlink and uplink.

Two configurations are supported for front-loaded DMRS in downlink and uplink with CP-OFDM waveform, which are illustrated in FIGS. 1A to 1D.

As shown therein, the front-loaded reference signals are allocated to resources of the first data symbol adjacent to resources for the signaling section (the signaling section consisting of, e.g., two symbols) of a TTI if one-symbol DMRS are used, and to resources of the first two data symbols if two-symbol DMRS are used.

Figure 1A:
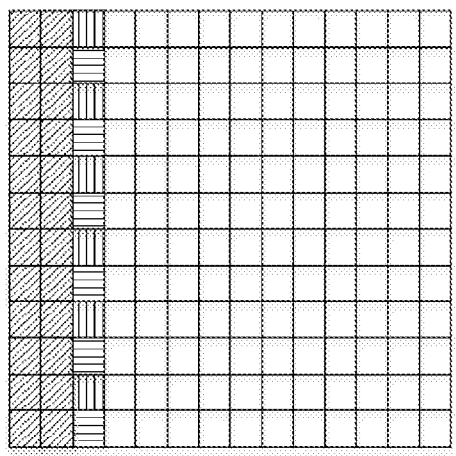
FIGS. 1A to 1D are schematic drawings of front loaded demodulation reference signal (DMRS) configuration types.
Figure 1B:
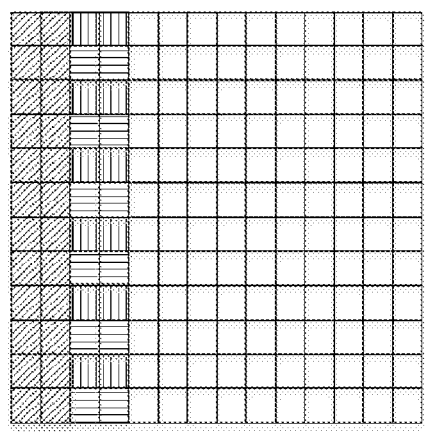

FIGS. 1A to 1B each show an exemplary resource grid corresponding to a slot of 14 symbols and 12 subcarriers. The first two symbols on the left of each of the figures correspond to the signaling section of a slot. The physical downlink control channel (PDCCH) is signaled in the signaling section. In LTE, this exemplary resource grid would correspond to one of two slots of a subframe. However, this shall not limit the present disclosure since a subframe may also correspond to a (single) slot or include more than two slots; and the slot may also have more or less than 14 symbols and 12 subcarriers.

The first front-loaded DMRS configuration corresponding to configuration type 1 is shown in FIGS. 1A and 1B. This configuration is aimed at supporting up to eight orthogonal DMRS ports for Single-User Multiple Input Multiple Output (SU-MIMO) or Multi-User Multiple Input Multiple Output (MU-MIMO). The first configuration supports up to four orthogonal DMRS ports if one symbol DMRS are used, as shown in FIG. 1A. In particular, two combs and two cyclic shifts (CS) may be combined to form up to four component sets, and the respective resulting component sets can be respectively assigned to up to four DMRS ports. These component sets are in the context of the present disclosure also referred to as CDM groups.

If two symbol DMRS are used, as shown in FIG. 1B, the two combs and two cyclic shifts may be combined with two time division Orthogonal Cover Codes (TD-OCC) in particular Walsh-Hadamard TD-OCCs, ({1,1} and {1,−1}), and up to eight orthogonal DMRS ports may be supported. However, in the two-symbol DMRS case it should also be possible to schedule up to 4 DMRS ports without using both {1,1} and {1,−1}.

Figure 1C:
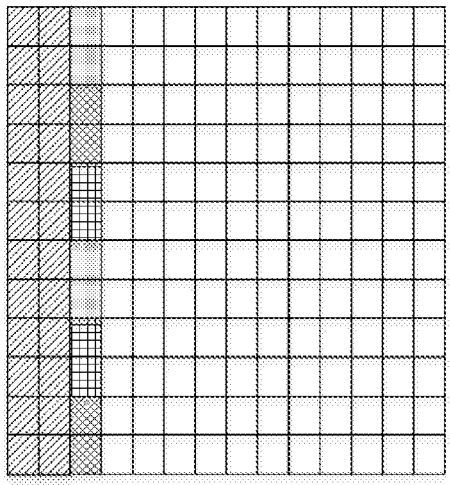
Figure 1D:
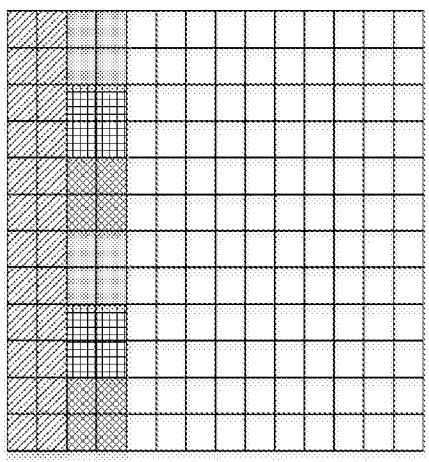

The second front-loaded DMRS configuration corresponding to configuration type 2 is shown in FIGS. 1C and 1D. This configuration provides support for up to twelve orthogonal ports for SU-MIMO or MU-MIMO. In particular, two (Walsh-Hadamard) frequency division Orthogonal Cover Codes (FD-OCC) respectively applied across adjacent REs (resource elements) in the frequency domain yield six component sets or CDM groups.

As can be seen from FIGS. 1C and 1D, with twelve subcarriers, pairs of adjacent REs are grouped into three Frequency Division Multiplexing (FDM) groups. Accordingly, the six component sets result from two FD-OCCs (both {1,1} and {1,−1}) applied respectively to the three FDM groups. In the case of one symbol DMRS (FIG. 1C), the resulting six respective component sets can be assigned to up to six orthogonal DMRS ports. In the case of two-symbol DMRS, these six component sets may further be combined with two TD-OCCs resulting in a capability to support up to twelve orthogonal DMRS ports (FIG. 1D).

As described above with reference to FIGS. 1A to 1D, combs, cyclic shifts, FD-OCCs, FDMs, and TD-OCCs constitute resource components for reference signals, in particular front-loaded DMRS.

These resource components are combined in accordance with the first or the second front-loaded DMRS configuration, and the resulting component sets or CDM groups are respectively assigned to orthogonal DMRS ports. However, usage of two-symbol DMRS should be possible even for lower ranks. Not all component sets or CDM groups that are supported by a particular configuration in the one-symbol or two symbol DMRS case need to be used for assignment of a port. In particular, also in the two-symbol case it should be possible to schedule up to 6 DMRS ports without using both {1,1} and {1,−1}.

From a user equipment (UE) perspective, DMRS ports multiplexed by frequency domain code division multiplexing (CDM) are quasi co-located.

It is still open for further study whether the front-load DMRS configuration type for a UE for UL and DL can be different or not. Moreover, if there are significant complexity/performance issues involved in the above agreements, down-selection can still be discussed.

LTE DMRS Configuration

The DMRS configurations in 3GPP NR described above are different from LTE, where there is a mainly a single configuration in downlink to support up to total 8 orthogonal ports/layers using code-division multiplexing in frequency and time using Walsh-Hadamard orthogonal cover codes. The configuration and further details on the DMRS configurations in LTE can be found in section 29.1.1 of S. Sesia, I. Toufik and M, Baker, LTE: The UMTS Long Term Evolution, Second Edition.

The table of layer-to port mapping in current LTE, which is taken from 3GPP TS 36.212, V14.3.0 (Table 5.3.3.1.5C-2) is shown in the Following Table 1:

TABLE 1

Antenna port(s), scrambling identity (SCID) and number of layers indication

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

In LTE, up to eight orthogonal DMRS ports for downlink are supported, which mainly use a single category of multiplexing scheme, OCC in time/frequency. Therefore, any of the port combinations could be used for mapping layers without impacting the performance for a given scenario. Furthermore, for a given number of layers, usage of resources (DMRS overhead) is the same for any port combination.

Moreover, LTE provides limited support for MU-MIMO. Also, a fixed DMRS configuration is supported; hence no additional signaling is required for dynamic configuration.

As can be seen from the Table 1, there are very limited combinations allowed for layer-to-port mapping in LTE. A length 4 bitmap is defined to signal the layer-to-port mapping for a given user. A minimum number of port combinations are supported for layer-to-port mapping results from the following restrictions. For up to two layers, port-indexing for the mapping is consecutive and non-overlapping. For three to eight layers, the indexing is consecutive, non-overlapping, and starting from index 0 as a fixed start point. The mapping is limited to one port combination.

In the latest release of LTE only transparent MU-MIMO (and no non-transparent MU-MIMO) is supported. However, this was not always the case:

In LTE Rel-8, when MU-MIMO was introduced for the first time to support transmission up to 2 UEs, non-transparent MU-MIMO was introduced by having a 1-bit dedicated power offset field. Yet, support for non-transparent MU-MIMO for more than two UEs was never agreed, particularly not in the later releases of LTE. The drawback of an increased signaling overhead was decided not to outweigh the benefits resulting therefrom.

DMRS Requirements for NR

The restrictions to the layer-to-port mapping of LTE are no longer bearable in 3GPP NR. Particularly, there is a demand for non-transparent MU-MIMO to benefit from the advantages of a new system design in 3GPP NR.

For example, for incorporating the support of non-transparent MU-MIMO into 3GPP NR, it would be possible to revisit the decision taken for LTE of not incorporating dedicated bit fields. However, also under current considerations, since there exists a dedicate bit field for MU-MIMO, the support is not necessary.

Description of Embodiments

The present disclosure facilitates the signaling of co-scheduling information (non-transparent MU-MIMO) on a per code-division multiplexing, CDM, group basis in a mobile communication system where data is transmitted and/or received in layers using multiple antennas. More particularly, the present disclosure suggests sets of layer-to-port mapping combination information which are combined with co-scheduling information to facilitate a more efficient and effective signaling mechanism.

Figure 2:
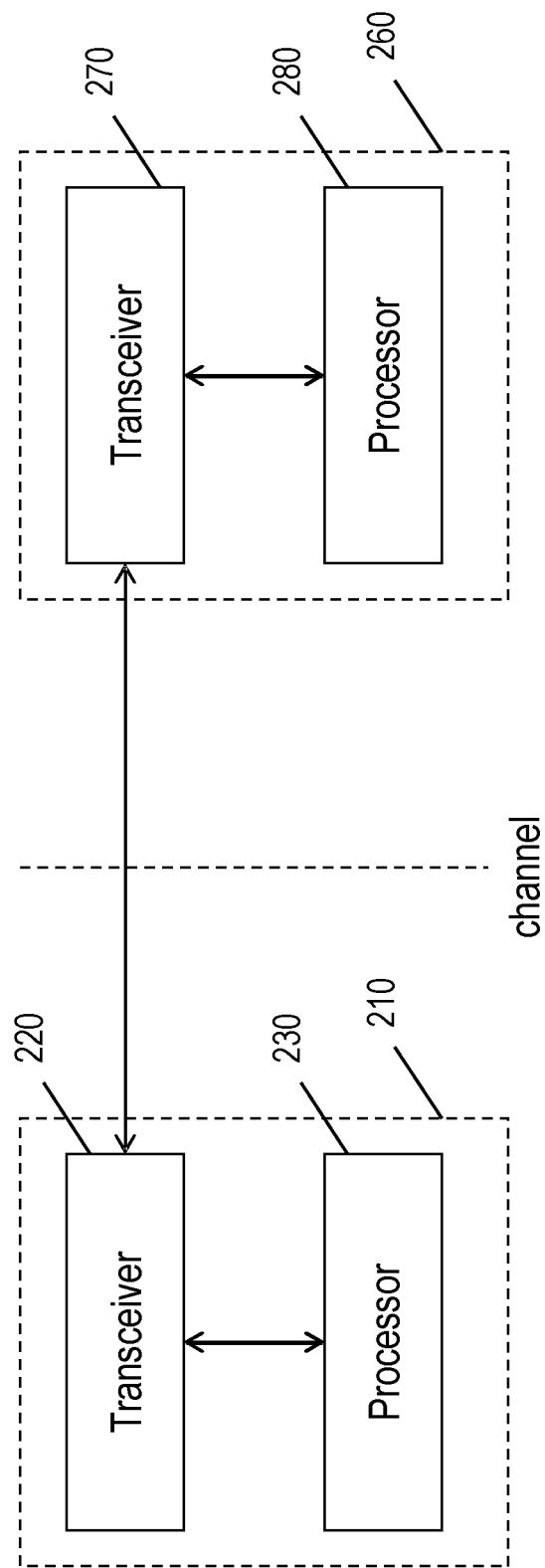
FIG. 2 is a block diagram showing the structure of a mobile terminal and a base station.

In an exemplary embodiment, as shown in FIG. 2, the present disclosure provides a mobile terminal 210 for transmitting and/or receiving data to/from a base station 260 which uses multiple antennas in a mobile communication system. The mobile terminal 210 and the base station 260 are configured to transmit and/or receive the data over a wireless channel 250.

The mobile terminal 210 may correspond to a user equipment (UE), as is usually named in LTE and NR, and the bases station 260 may correspond to an evolved NodeB (eNodeB or eNB) or a next generation NodeB (gNodeB or gNB), as is usually named in LTE and NR.

More particularly, the mobile terminal 210 is configured to transmit and/or receive the data in layers to/from the base station 260. As discussed above, the term layer (or spatial layer) refers to one of different streams that are generated by spatial multiplexing and then are exchanged between the mobile terminal 210 and the base station 260 over different antenna ports.

For a coherent demodulation of the transmitted and (subsequently) received data, reference signals are also exchanged between the mobile terminal 210 and the base station 260. As discussed above, the transmission and/or reception of reference signals is performed with reference to a layer-to-port mapping. This mapping specifies for each of the respective layers one DMRS port which is to be used for transmitting/receiving the reference signals.

Notably, the layer-to-port mapping varies depending on a configuration of the base station 260 and the mobile terminal 210, namely a configuration specified by the DMRS configuration type (e.g., DMRS configuration type 1 or 2) and the number of symbols to be used for DMRS (e.g., one-symbol or two-symbol DMRS). As discussed above, this configuration does not only determine the resources on which the DMRS are carried, but also the maximum number of DMRS ports that can be scheduled by the base station 260.

In other words, mobile terminal 210 and the base station 260 revert to different layer-to-port mappings depending on which one of plural configurations is chosen for communicating in the mobile communication system. The configuration of DMRS ports is specified so that the base station 260 and the mobile terminal can make use of the layer-to-port mapping in order to carry out the data transmission and/or reception.

For this purpose, the mobile terminal 210 comprises circuitry, for example transceiver 220, and processor 230, which, in operation, receives a parameter defining a configuration for assigning to DMRS ports respective (time-frequency) resources for carrying reference signals. In other words, the configuration assigns each of the reference signal of one or more DMRS ports to specific resources, which may also be referred to as (resource) component sets.

The resources or (resource) component sets are grouped in a plurality of code division multiplexing, CDM, groups. Particularly, a code division multiplexing, CDM, group specifies the resources or (resource) component sets on which reference signals are carried for each of the DMRS ports, such that on each of the resources, or (resource) component sets, there can be carried a maximum number of say 2 or 4 orthogonal reference signals on respective DMRS ports of the same CDM group.

Referring to the example shown in FIG. 1A, the resources of two combs (comb1, comb2), each with two cyclic shifts (resulting in a set of two different DMRS ports), are defining separate CDM groups (CDM group0, CDM group 1). For the example shown in FIG. 1B, the resources of two combs (comb1, comb2), each with two cyclic shifts and with two TD-OCCs (resulting in a set of four different DMRS ports), are defining separate CDM groups (CDM group0, CDM group 1).

Further, for the example shown in FIG. 1C, the resources of three FDM groups (FDM1, FDM2, FDM3), each with two FD-OCCs (resulting in a set of two different DMRS ports), are defining separate CDM groups (CDM group0, CDM group1, CDM group 2). Finally, for the example shown in FIG. 1D, the resources of three FDM groups (FDM1, FDM2, FDM3), each with two FD-OCCs and two TD-OCCs (resulting in a set of four different DMRS ports), are defining separate CDM groups (CDM group0, CDM group 1, CDM group 2).

As already set out above, the (time-frequency) resources for carrying the reference signals are grouped in a plurality of code division multiplexing, CDM, groups. Particularly, in the context of the present disclosure, a CDM group refers to a set of DMRS ports that use the same resources and are orthogonal to each other by using orthogonal cover codes (OCC) or code division multiplexing (CDM) in time and/or frequency.

In the context of the present disclosure, reference is made to CDM groups from the perspective of the mobile terminal 210. For the mobile terminal 210, a CDM group refers to resources or (resource) component sets of DMRS ports which are quasi co-located.

Again to the exemplary embodiment, the circuitry of the mobile terminal 210, for example transceiver 220, and processor 230, in operation, receives control information indicating one of the set of layer-to-port mapping combinations which is to be applied for arranging reference signals on DMRS ports of at least one CDM group for data transmission and/or reception.

The mobile station 210 can then utilize the indicated one of a set of layer-to-port mapping combination to determine the DMRS port or ports and, on the basis of the configuration of the resources or (resource) component sets, determine for this DMRS port or ports the respective resources for the data transmission and/or reception. In other words, only in combination do the configuration and the indicated layer-to-port mapping allow for the data transmission and/or reception.

However, both the configuration parameters and the control information are not received by the mobile terminal 210 at a same time. Rather, the base station 260 may signal the configuration parameters on an infrequent basis, for example via the Radio Resource Control, RRC; protocol, whereas the control information may be signaled together with scheduling information in a downlink control information, DCI, via the physical downlink control channel, PDCCH.

Further to the exemplary embodiment, the received control information is, however, not restricted to only indicate to the mobile terminal 210 the one of the set of layer-to-port mapping configurations. Rather, the received control information additionally indicates to the mobile terminal 210 a co-scheduling information on a per CDM group basis.

This co-scheduling information may then be utilized for the same data transmission and/or reception, namely to improve interference cancellation and/or rate matching for the data transmission and/or reception of the same TTI.

Indicating co-scheduling information on a per CDM group basis provides an advantageous trade-off for non-transparent MU-MIMO signaling. Particularly, the indication of co-scheduling on a per CDM group basis attains the advantage of minimizing the signaling overhead with respect to an improved the interference cancellation and/or the adaptation of rate matching for increasing the data transmission capacity.

In the following, a distinction is made between the indication of co-scheduling information for CDM group or groups (henceforth referred to as first set of CDM groups) in which the mobile terminal 210 is scheduled to perform reference signal transmission and/or reception, and other CDM group or groups which are not scheduled for the mobile terminal 210 (referred to as second set of CDM groups). This distinction, however, becomes even more apparent in view of the advantages resulting from the co-scheduling information.

As mentioned above, the mobile terminal 210 can use the co-scheduling indication for improved interference cancellation.

In each CDM group, a base station may co-schedule different mobile terminals to assign reference signals to DMRS ports on same resources (of a same CDM group). Even though the DMRS ports are said to be orthogonal to each other in a CDM group, there may be leakage-effects between the reference signals, resulting in deteriorated reception quality of the reference signals. This interference may thus lead to inferior coherent demodulation capabilities for the data transmission and/or reception.

Now, with the additional co-scheduling information on the per CDM group basis, the mobile station is aware of co-scheduling on CDM group(s), namely on the resources, which are also carrying its "own" reference signals. Thus, with this additional co-scheduling information, the mobile station can perform interference cancellation on the reference signals, thereby improving the coherent demodulation capabilities.

Notably, the improved interference cancellation is however related to co-scheduling information in the CDM group(s) in which mobile terminal 210 is scheduled to perform reference signal transmission and/or reception (the first set of CDM groups).

Furthermore, the mobile terminal 210 can use the co-scheduled indication for improved rate matching.

In each CDM group, a base station may schedule different mobile terminals to assign reference signals to DMRS ports on different resources (e.g., of different CDM groups). Even though the scheduling of DMRS ports of different CDM groups is optimal with regard to their interference properties, this scheduling blocks the mobile terminal from re-using the different resources (out of context) for transmission and/or reception of data.

In other words, information on the (actual) assignment of reference signals on different resources (of different CDM groups) puts a mobile terminal into a position where it can decide to allocate to this (additional) different resources (of different CDM groups) symbols carrying a data transmission and/or reception. It goes without saying that this increases the data transmission capacity in the respective TTI, hence necessitates an adapted rate matching to make use of the increase in data transmission capacity.

Now, with the additional co-scheduling information on the per CDM group basis, the mobile station is aware of co-scheduling on different CDM group(s), namely on the resources, which are not carrying its "own" reference signals. With this additional co-scheduling information, the mobile terminal can then determine whether or not it can re-use these resources from the different CDM group(s) for data transmission and/or reception, which, however, requires an accordingly adapted rate matching to the increase in data transmission capacity.

Notably, the improved rate matching for the data transmission and/or reception of the same TTI is however only related to co-scheduling information in the different CDM group(s) in which the mobile terminal is not scheduled to perform reference signal transmission and/or reception (the second set of CDM groups).

In summary, the advantages of an improved interference cancellation and adaptation of rate matching for increasing the data transmission capacity, both tie in with the presence of co-scheduling information on a per CDM group basis, however, may depend on whether co-scheduling is indicated for CDM group(s) on which the mobile terminal is scheduled to perform reference signal transmission (the first set of CDM groups) or not (the second set of CDM groups).

Thus, it is already apparent from this disclosure that indication of co-scheduling information already provides for advantageous effects, even if it is signaled not for all but only for a subset of the plurality of CDM groups.

In the context of the present disclosure, the co-scheduling information is signaled on a per CDM group basis. This co-scheduling information shall be understood as an indication to the mobile terminal that the base station is co-scheduling a different mobile terminal on DMRS ports of respective resources of each of the CDM groups for reference signal transmission and/or reception.

Depending on the CDM group for which the co-scheduling information is provided, it may be advantageous to interpret the co-scheduling information differently:

Regarding the second set of CDM groups, the co-scheduling information allows a mobile terminal to adapt the rate mating to benefit from an increase in data transmission capacity. Notably, for this it is only necessary for the mobile terminal to know, if (or not) there is at least a single different mobile terminal assigned to a DMRS port of the different CDM group(s).

If in one of the second set of CDM groups there is at least a single DMRS port assigned, then the respective reference signal transmission and/or reception is considered more important than the adaptation of rate matching and the benefit from an increase in data transmission capacity. Otherwise, the mobile terminal may adapt rate matching to take advantage increase in data transmission capacity thereof.

Thus, for the second set of CDM groups, the co-scheduling information may thus be interpreted as indicating "at least one" different mobile terminal which is scheduled per CDM group.

Regarding the first set of CDM groups, the co-scheduling information allows the mobile terminal to benefit from an improved interference cancellation. The improved interference cancellation may, however, only become necessary if there is more than a given number (referred to as number X in FIGS. 3-6), say more than one (e.g., two or three) mobile terminals assigned different DMRS ports of a same CDM group of the first set.

Instead, it there are less than the given number, say one or none, mobile terminals assigned to different DMRS ports of the same CDM group of the first set, then, it may be sufficient to expect that the existing mechanisms are operating sufficient to establish the orthogonal DMRS ports.

For example, in a 3GPP NR deployment scenario, the interference cancellation is improved by utilizing a blind interference detection mechanism in the receiver of the reference signals. Thereby without any prior knowledge of the interference at the receiver (the co-scheduling information only indicates that there is interference from a given number, say two or three, mobile terminals) an improvement in the reception properties of the reference signals is attained.

Since the blind interference detection mechanism is computationally complex, costly on the power consumption and introduces a non-negligible amount of processing delay into the signaling flow, this however is only advantageous if there is (actually) a high amount of interference indicated. For this purpose, the number (referred to as number X in FIGS. 3-6) for which co-scheduling interference is indicated in the first set of CDM groups of is different from the number for which co-scheduling interference is indicated in the second set of CDM groups.

In other words, the interpretation of the co-scheduling information may depend on the CDM group and accordingly the set of CDM groups for which it is received. If it is received for a CDM groups of the first set, in which its "own" reference signals are carried, then the co-scheduling information may indicate the presence of a given number of co-scheduled mobile terminals per CDM group as compared with CDM groups of the second set, where the co-scheduling information may indicate the presence of any co-scheduled mobile terminals per CDM group.

Similar to the above, the present disclosure also provides a base station 260 for transmitting and/or receiving data to/from a mobile terminal 210 which uses multiple antennas in a mobile communication system. Also, here the base station 260 and the mobile terminal 210 are configured to transmit and/or receive the data over a wireless channel 250.

The base station 260 comprises circuitry, for example transceiver 270 and processor 280, which, in operation, transmits, to the mobile terminal 210, a parameter defining a configuration for assigning to ports respective resources for carrying reference signals, the resources being grouped in a plurality of code division multiplexing, CDM, groups, and transmits, to the mobile terminal 210, control information indicating one of the set of layer-to-port mapping combinations which is to be applied for arranging reference signals on ports of at least one CDM group for data transmission and/or reception, Additionally, also here the control information are indicating a co-scheduling information for at least one and/or at least a different CDM group of the plurality of CDM groups for the same data transmission and/or reception.

Referring now to the form in which the control information is communicated between the base station 260 and the mobile station 210. For this purpose, reference is made to the FIGS. 3-6 as exemplary implementations of the signaling mechanism.

As already discussed before, control information (column 1 of each figure) is structured such that it not only indicate, to the mobile terminal 210, the one of the set of layer-to-port mapping configurations (columns 2 and 3 of each figure), but also indicates, to the mobile terminal 210, a co-scheduling information (columns 4 and 5 or 4 to 6 of each figure) on a per CDM group basis.

In this respect, a mobile terminal 210, having received a control information, for example in binary form, refers to the row with the corresponding index (in column 1 of each figure) and thus obtains, the layer-to-port mapping which is being indicated by the base station, and also the co-scheduling information for each of the CDM groups. As can be seen from the figures, it is suggested for the control information to allow separate (multiple) rows with same port-to-layer mappings in order to reflect all possible permutations of co-scheduling information.

In more detail, FIG. 3 shows an exemplary set of layer-to-port mapping combinations (columns 2 and 3) combined with co-scheduling information (columns 4 and 5) on a per CDM group basis for a DMRS configuration type 1, and 1-symbol DMRS configuration. This example accordingly is based on the assignment of DMRS ports to resources as shown in FIG. 1A, where a total of two DMRS ports can be scheduled in each of two CDM groups.

Similarly, FIG. 4 shows an exemplary set of layer-to-port mapping combinations (columns 2 and 3) combined with co-scheduling information (columns 4 and 5) on a per CDM group basis for a DMRS configuration type 1, and 2-symbol DMRS configuration. This example accordingly is based on the assignment of DMRS ports to resources as shown in FIG. 1B, where a total of four DMRS ports can be assigned in each of two CDM groups.

Further, FIG. 5 shows an exemplary set of layer-to-port mapping combinations (columns 2 and 3) combined with co-scheduling information (columns 4 to 6) on a per CDM group basis for the case of a DMRS configuration type 2, and 1-symbol DMRS. This example accordingly is based on the assignment of DMRS ports to resources as shown in FIG. 1C, where a total number of two DMRS ports can be assigned in each of three CDM groups.

Further, FIGS. 6a and 6b show exemplary set of layer-to-port mapping combinations (columns 2 and 3) combined with co-scheduling information (columns 4 to 6) on a per CDM group basis for the case of a DMRS configuration type 2, and 2-symbol DMRS. This example accordingly is based on the assignment of DMRS ports to resources as shown in FIG. 1D, where a total of four DMRS ports can be scheduled in each of three CDM groups.

For all the exemplary implementation of the FIGS. 3-6, it is assumed that the CDM groups and DMRS ports are indexed in the following manner:
1. The CDM groups are consecutively indexed, and the DMRS ports of the CDM groups are (also) consecutively indexed, namely such that the indexes of the DMRS ports increases with indexes of the plurality of CDM groups.

In other words, considering a (single) CDM group, the indexes of the DMRS ports of this CDM group are distributed consecutively. This can already be inferred from the fact that the DMRS ports for each of the CDM groups, irrespective of the specific CDM group, are consecutively indexed.

Considering now separate CDM groups, the indexes of DMRS ports are distributed into the CDM groups such that any one of the DMRS port(s), of a specific CDM group with a lower index, has a lower index than any one of the DMRS port(s) of another specific CDM group with a next higher index.

Having specified the indexing of the CDM groups and DMRS ports in an consecutive manner, it is also assumed, with regard to the exemplary implementation of the FIGS. 3-6, that the base station is assigning the DMRS ports to mobile station consecutively and increasingly (or sequentially) over all of the plurality of CDM groups.
2. Mobile terminals are assigned DMRS ports from among all of the plurality of CDM groups having consecutive indexes starting with the DMRS port with the lowest index.

Assuming, for the sake of argument, a base station 260 assigns to a mobile terminal 210 the DMRS port with the lowest index (DMRS port 0, or P0). Then, should the base station 260 want to assign to the same mobile terminal 210, another DMRS port, it must proceed with assigning the DMRS port with the next higher consecutive index (DMRS port 1, or P1). Thus, it is not possible for one mobile terminal to be assigned two DMRS ports which do not have consecutive indexes.

Reducing the total number of rows that can be indexed as control information reduces the total amount of signaling overhead in the control signal. Particularly, the inventors have recognized the signaling of control information may be most efficient and effective when the following rules are obeyed:
3. The maximum number of DMRS ports that can be scheduled per mobile terminal in MU-MIMO is restricted to a given number, for instance, to a number which is lower than the maximum number DMRS ports defined by the configuration for assigning to ports respective resources.

By reducing on the one hand the maximum number of DMRS ports per mobile terminal in MU-MIMO, the total number of permutations which are reflected in the control information, indicating the layer-to-port mapping as well as the co-scheduling on a per CDM group basis, drastically reduces.

Should, on the other hand control information allow indicating, with reference to the layer-to-port mapping, an exceeding number of DMRS ports (higher than the maximum number of DMRS ports in MU-MIMO), then the mobile terminal can assume it is operating in SU-MIMO for the data transmission and/or reception.

In the later case, from the mere fact that SU-MIMO is configured, there is no necessity to additionally indicate co-scheduling information regarding any of the CDM groups. Consistent therewith, the control information then, for example, indicates the absence of any co-scheduling.

For example, this is shown in FIG. 3 for the control information corresponding to index 11 (control information="1011") and corresponding to index 12 (control information="1100"). There, despite of the maximum number of DMRS ports per mobile terminal in MU-MIMO being 2, three DMRS ports (ports P0-P2) or four DMRS ports (ports (P0-P4) are indicated. Accordingly, the mobile terminal knows that the data transmission and/or reception are performed in SU-MIMO. Thus, there is no co-scheduling, hence, resulting in the co-scheduling information "0" for the CDM group 0 and "0" for the CDM group 1.

4. The maximum number of DMRS ports which can be scheduled per mobile terminal in SU-MIMO is restricted to a given number, for instance, to a number which is lower than the maximum number of DMRS ports defined by the configuration for assigning to ports respective resources.

By reducing the maximum number of DMRS ports per mobile terminal in SU-MIMO, the total number of permutations which are reflected in the control information, indicating the layer-to-port mapping as well as the co-scheduling on a per CDM group basis, further reduces.

For example, this is shown in FIG. 5, where despite the availability of a total of eight DMRS ports (ports P0-P7), the indexes of the control information terminate with number 22 (control information="10110") relating to "only" four ports (ports P0-P3) that are being operated in SU-MIMO.

Please note that in FIGS. 4 and 6a/b, there is not SU-MIMO mode of operation that can be configured, since the maximum number of ports per mobile terminal in MU-MIMO and in SU-MIMO are equal, thus giving precedence to MU-MIMO for the indication of the co-scheduling information.

5. A mobile terminal which is assigned all DMRS ports of a (single) CDM group will not expect co-scheduling in the same CDM group.

This also reduces the number of permutations which are reflected in the control information indicating the layer-to-port mapping as well as the co-scheduling on a per CDM group basis.

For example, this is shown in FIG. 3, where for the control information corresponding to index 8 (control information "1000") and to index 9 (control information "1001"), all two DMRS ports (ports P0-P1) in CDM group 0 are assigned to mobile terminal itself such that nothing else but the co-scheduling information "0" is indicated for this CDM group 0.

6. A mobile terminal which is not assigned the DMRS port with the lowest index of a (single) CDM group will expect co-scheduling in the same CDM group and in CDM groups with a lower index.

This signaling of co-scheduling information for a CDM group exploits the fact that the DMRS ports are being assigned in a consecutive and increasing manner (as discussed under Nr. 2 above).

Assuming, for the sake of argument, a base station 260 assigns to a mobile terminal 210 the DMRS port with an intermediate index (DMRS port 1, or P1), not a DMRS port with the lowest index (DMRS port 0, or P0). Then, since the base station 260 is required to assign the DMRS ports starting with the lowest index, the mobile terminal 210 can infer, that there is a co-scheduled (other) mobile terminal in the same CDM group to which the assigned DMRS port with index 1 belongs. Thus, it is inherent that the co-scheduling information indicated by the control information in MU-MIMO is always "1" in the same CDM group.

For example, this is shown in FIG. 3, where for the control information corresponding to index 3 (control information="0011"), and corresponding to index 4 (control information="0100"), the indicated co-scheduling information is always "1" in the CDM group 0. Thus, also with this rule, the total number of permutations is reduced.

This inherent signaling of co-scheduling information holds true not only for the CDM group to which the assigned DMRS port(s) belong(s), but also extends to those CDM groups which have a lower index.

Assuming, for the sake of argument, a base station 260 assigns to a mobile terminal 210 the DMRS port with an intermediate index (DMRS port 3, or P3), not a DMRS port with the lowest index (DMRS port 0, or P0). Then, since the base station 260 is required to assign the DMRS ports starting with the lowest index, the mobile terminal 210 can infer, that there is a co-scheduled (other) mobile terminal in the same CDM group 1 to which the assigned DMRS port with index 3 belongs, and also in the CDM group 0. Thus, the co-scheduling information indicated for the CDM group 0 and CDM group 1 by the control information in MU-MIMO is always "1".

For example, this is shown in FIG. 3, where for the control information corresponding to index 7 (control information="0111"), the indicated co-scheduling information is always "1" in the CDM group 0 and the CDM group 1. Thus, also with this rule, the total number of permutations is reduced.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is suggested for transmitting and/or receiving data in layers to/from a base station using multiple antennas in a mobile communication system, comprising circuitry which, in operation, receives, from the base station, a parameter defining a configuration for assigning to ports respective resources for carrying reference signals, the resources being grouped in a plurality of code division multiplexing, CDM, groups, and receives from the base station, control information indicating one of the set of layer-to-port mapping combinations which is to be applied for arranging reference signals on ports of at least one CDM group for data transmission and/or reception, wherein the control information are additionally indicating a co-scheduling information for the at least one and/or at least a different CDM group of the plurality of CDM groups for the same data transmission and/or reception.

According to a second aspect, which can be combined with the first aspect, the control information indicates the co-scheduling information for all or subset of the plurality of CDM groups.

According to a third aspect, which can be combined with the first or second aspect, the co-scheduling information indicates that the base station is co-scheduling a different mobile terminal in the at least one and/or different CDM group.

According to a fourth aspect, which can be combined with the first or second aspect, the co-scheduling information indicates that the base station is co-scheduling at least a number of different mobile terminals in the at least one and/or different CDM group.

According to the fifth aspect, which can be combined with the first to fourth aspect, the co-scheduling information is binary information indicating the presence or absence of co-scheduling in each of the plurality of CDM groups.

According to a sixth aspect, which can be combined with the first to fifth aspect, the plurality of CDM groups are consecutively indexed and the ports of each of the plurality of CDM groups are consecutively indexed, such that the indexes of the ports increases with the indexes of plurality of CDM groups.

According to a seventh aspect, which can be combined with the first to sixth aspect, the co-scheduling information indicates co-scheduling only for those of the plurality of CDM groups having an index corresponding to or higher than the at least one CDM group.

According to a eighth aspect, which can be combined with the first to seventh aspect, the resources assigned to ports of a CDM group, having the index lower than the lowest index of the ports indicated in the control information for arranging the reference signals, are inherently known to be co-scheduled by the base station.

According to a ninth aspect, which can be combined with the first to eighth aspect the mapping implies indexing the layer-to-port mapping combinations and the co-scheduling information.

According to a tenth aspect, which can be combined with the first to ninth aspect, the resources assigned to the ports include two resource component configurations, a first resource component configuration including a comb and a cyclic shift of reference signals, the comb consisting either of subcarriers with an odd subcarrier index or of subcarriers with an even subcarrier index, a second resource component configuration including frequency division multiplexing and a frequency division orthogonal cover code, OCC, and the circuitry, in operation, further receives, from the base station, an indicator indicating whether the first resource component configuration or the second resource component configuration is used.

According to an eleventh aspect, which can be combined with the first to tenth aspect, the parameter defining the configuration for assigning to ports respective resources for carrying reference signals is received via a Radio Resource Control, RRC, protocol.

According to a twelfth aspect, which can be combined with the first to eleventh aspect, wherein the control information indicating the one of the set of layer-to-port mapping combinations and indicating the co-scheduling information is received via a physical downlink control channel, PDCCH.

According to a thirteenth aspect, which can be combined with the first to twelfth aspect, the reference signals are front loaded demodulation reference signals.

According to a fourteenth aspect, which can be combined with the first to thirteenth aspect, the mobile terminal further comprises a transceiver which, in operation, performs the data transmission and/or reception applying the indicated layer-to-port mapping combination.

According to a fifteenth aspect, which can be combined with the first to fourteenth aspect, the mobile terminal further comprises a processor which in operation performs interference compensation on the received reference signals and/or rate matching for the data transmission and/or reception.

According to a sixteenth aspect, a method is suggested to be performed by a mobile terminal for transmitting and/or receiving data in layers to/from a base station using multiple antennas in a mobile communication system, comprising the steps of: receiving, from the base station, a parameter defining a configuration for assigning to ports respective resources for carrying reference signals, the resources being grouped in a plurality of code division multiplexing, CDM, groups, and receiving from the base station, control information indicating one of the set of layer-to-port mapping combinations which is to be applied for arranging reference signals on ports of at least one CDM group for data transmission and/or reception, wherein the control information are additionally indicating a co-scheduling information for the at least one and/or at least a different CDM group of the plurality of CDM groups for the same data transmission and/or reception.

According to a seventh aspect, which can be combined with the sixteenth aspect, the control information indicates the co-scheduling information for all or subset of the plurality of CDM groups.

According to an eighteenth aspect, which can be combined with the sixteenth or seventeenth aspect, the co-scheduling information indicates that the base station is co-scheduling a different mobile terminal in the at least one and/or different CDM group.

According to a nineteenth aspect, which can be combined with the sixteenth or seventeenth aspect, the co-scheduling information indicates that the base station is co-scheduling at least a number of different mobile terminals in the at least one and/or different CDM group.

According to a twentieth aspect, which can be combined with the sixteenth to nineteenth aspect, the co-scheduling information is binary information indicating the presence or absence of co-scheduling in each of the plurality of CDM groups.

According to a twenty first aspect, which can be combined with the sixteenth to twentieth aspect, the plurality of CDM groups are consecutively indexed, and the ports of each of the plurality of CDM groups are consecutively indexed, such that the indexes of the ports increases with the indexes of plurality of CDM groups.

According to a twenty second aspect, which can be combined with the sixteenth to twenty first aspect, the co-scheduling information indicates co-scheduling only for those of the plurality of CDM groups having an index corresponding to or higher than the at least one CDM group.

According to a twenty third aspect, which can be combined with the sixteenth to twenty second aspect, the resources assigned to ports of a CDM group, having the index lower than the lowest index of the ports indicated in the control information for arranging the reference signals, are inherently known to be co-scheduled by the base station.

According to a twenty fourth aspect, which can be combined with the sixteenth to twenty third aspect, the mapping implies indexing the layer-to-port mapping combinations and the co-scheduling information.

According to a twenty fifth aspect, which can be combined with the sixteenth to twenty fourth aspect, the resources assigned to the ports include two resource component configurations, a first resource component configuration including a comb and a cyclic shift of reference signals, the comb consisting either of subcarriers with an odd subcarrier index or of subcarriers with an even subcarrier index, a second resource component configuration including frequency division multiplexing and a frequency division orthogonal cover code, OCC, and the method comprises the further step of receiving, from the base station, an indicator indicating whether the first resource component configuration or the second resource component configuration is used.

According to a twenty sixth aspect, which can be combined with the sixteenth to twenty fifth aspect, the parameter defining the configuration for assigning to ports respective resources for carrying reference signals is received via a Radio Resource Control, RRC, protocol.

According to a twenty seventh aspect, which can be combined with the sixteenth to twenty sixth aspect, the control information indicating the one of the set of layer-to-port mapping combinations and indicating the co-scheduling information is received via a physical downlink control channel, PDCCH.

According to a twenty eighth aspect, which can be combined with the sixteenth to twenty seventh aspect, the reference signals are front loaded demodulation reference signals.

According to a twenty ninth aspect, which can be combined with the sixteenth to twenty eighth aspect, the method comprises the further step of performing the data transmission and/or reception applying the indicated layer-to-port mapping combination.

According to a thirtieth aspect, which can be combined with the sixteenth to twenty ninth aspect, the method comprises the further step of performs interference compensation on the received reference signals and/or rate matching for the data transmission and/or reception.

According to a thirty first aspect, a base station is suggested for transmitting and/or receiving data in layers to/from a mobile terminal (210) using multiple antennas in a mobile communication system, comprising: circuitry (270; 280) which, in operation, transmits, to the mobile terminal, a parameter defining a configuration for assigning to ports respective resources for carrying reference signals, the resources being grouped in a plurality of code division multiplexing, CDM, groups, and transmits, to the mobile terminal, control information indicating one of the set of layer-to-port mapping combinations which is to be applied for arranging reference signals on ports of at least one CDM group for data transmission and/or reception, wherein the control information are additionally indicating a co-scheduling information for the at least one and/or at least a different CDM group of the plurality of CDM groups for the same data transmission and/or reception.

According to a thirty second aspect, a method to be performed by a base station is suggested for transmitting and/or receiving data in layers to/from a mobile terminal using multiple antennas in a mobile communication system, comprising the steps of: transmitting, to the mobile terminal, a parameter defining a configuration for assigning to ports respective resources for carrying reference signals, the resources being grouped in a plurality of code division multiplexing, CDM, groups, and transmitting, to the mobile terminal, control information indicating one of the set of layer-to-port mapping combinations which is to be applied for arranging reference signals on ports of at least one CDM group for data transmission and/or reception, wherein the control information are additionally indicating a co-scheduling information for the at least one and/or at least a different CDM group of the plurality of CDM groups for the same data transmission and/or reception.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment for transmitting and/or receiving data in layers to/from a base station using multiple antennas in a mobile communication system, comprising
circuitry which, in operation,
receives, from the base station, a parameter defining a configuration for assigning to ports respective resources for carrying reference signals, the resources being grouped in a plurality of code division multiplexing (CDM) groups, and
receives from the base station, control information indicating one of a set of layer-to-port mapping combinations which is to be applied for arranging reference signals on ports of at least one CDM group for data transmission and/or reception,
wherein the control information additionally indicates co-scheduling information for the at least one and/or at least a different CDM group of the plurality of CDM groups for the same data transmission and/or reception,
wherein the plurality of CDM groups are consecutively indexed and wherein the ports of each of the plurality of CDM groups are consecutively indexed, such that the indexes of the ports increase with the indexes of the plurality of CDM groups.

2. The user equipment according to claim 1, wherein the control information indicates the co-scheduling information for all or a subset of the plurality of CDM groups.

3. The user equipment according to claim 1, wherein the co-scheduling information indicates that the base station is co-scheduling a different user equipment in the at least one and/or different CDM group.

4. The user equipment according to claim 1, wherein the co-scheduling information indicates that the base station is co-scheduling at least a number of different user equipments in the at least one and/or different CDM group.

5. The user equipment according to claim 1, wherein the co-scheduling information is binary information indicating the presence or absence of co-scheduling in each of the plurality of CDM groups.

6. The user equipment according to claim 1, wherein the co-scheduling information indicates co-scheduling only for those of the plurality of CDM groups having an index corresponding to or higher than the at least one CDM group.

7. The user equipment according to claim 1, wherein the resources assigned to ports of a CDM group, having the index lower than the lowest index of the ports indicated in the control information for arranging the reference signals, are inherently known to be co-scheduled by the base station.

8. The user equipment according to claim 1, wherein the mapping implies indexing the layer-to-port mapping combinations and the co-scheduling information.

9. The user equipment according to claim 1, wherein the resources assigned to the ports include two resource component configurations,
   a first resource component configuration including a comb and a cyclic shift of reference signals, the comb consisting either of subcarriers with an odd subcarrier index or of subcarriers with an even subcarrier index,
   a second resource component configuration including frequency division multiplexing and a frequency division orthogonal cover code (OCC), and
   the circuitry, in operation, further receives, from the base station, an indicator indicating whether the first resource component configuration or the second resource component configuration is used.

10. The user equipment according to claim 1, wherein the parameter defining the configuration for assigning to ports respective resources for carrying reference signals is received via a Radio Resource Control (RRC) protocol.

11. The user equipment according to claim 1, wherein the control information indicating the one of the set of layer-to-port mapping combinations and indicating the co-scheduling information is received via a physical downlink control channel (PDCCH).

12. The user equipment according to claim 1, wherein the reference signals are front loaded demodulation reference signals.

13. The user equipment according to claim 1, further comprising a transceiver which, in operation, performs the data transmission and/or reception applying the indicated layer-to-port mapping combination.

14. The user equipment according to claim 1, further comprising a processor which, in operation, performs interference compensation on the received reference signals and/or rate matching for the data transmission and/or reception.

15. A method to be performed by a user equipment for transmitting and/or receiving data in layers to/from a base station using multiple antennas in a mobile communication system, comprising the steps of:
   receiving, from the base station, a parameter defining a configuration for assigning to ports respective resources for carrying reference signals, the resources being grouped in a plurality of code division multiplexing (CDM) groups, and
   receiving, from the base station, control information indicating one of a set of layer-to-port mapping combinations which is to be applied for arranging reference signals on ports of at least one CDM group for data transmission and/or reception,
   wherein the control information additionally indicates co-scheduling information for the at least one and/or at least a different CDM group of the plurality of CDM groups for the same data transmission and/or reception, wherein the plurality of CDM groups are consecutively indexed and wherein the ports of each of the plurality of CDM groups are consecutively indexed, such that the indexes of the ports increase with the indexes of the plurality of CDM groups.

16. The method according to claim 15, wherein the control information indicates the co-scheduling information for all or a subset of the plurality of CDM groups.

17. A base station for transmitting and/or receiving data in layers to/from a user equipment using multiple antennas in a mobile communication system, comprising:
   circuitry which, in operation,
   transmits, to the user equipment, a parameter defining a configuration for assigning to ports respective resources for carrying reference signals, the resources being grouped in a plurality of code division multiplexing (CDM) groups, and
   transmits, to the user equipment, control information indicating one of a set of layer-to-port mapping combinations which is to be applied for arranging reference signals on ports of at least one CDM group for data transmission and/or reception,
   wherein the control information additionally indicates co-scheduling information for the at least one and/or at least a different CDM group of the plurality of CDM groups for the same data, wherein the plurality of CDM groups are consecutively indexed and wherein the ports of each of the plurality of CDM groups are consecutively indexed, such that the indexes of the ports increase with the indexes of the plurality of CDM groups.

* * * * *